United States Patent [19]

Turetsky

[11] 4,196,086

[45] * Apr. 1, 1980

[54] FILTER-PURIFIER CARTRIDGE

[76] Inventor: Isadore Turetsky, 23940 Welby Way, Canoga Park, Calif. 91307

[*] Notice: The portion of the term of this patent subsequent to Aug. 15, 1995, has been disclaimed.

[21] Appl. No.: 9,604

[22] Filed: Feb. 2, 1979

[51] Int. Cl.² .................... B01D 23/06; B01D 27/02; B01D 27/04
[52] U.S. Cl. .................................. 210/232; 55/318; 55/482; 210/266; 210/282; 210/314; 210/335; 210/489
[58] Field of Search ............... 210/73, 232, 282, 266, 210/295, 314, 316, 318, 335, 336, 489; 55/318, 482

[56] References Cited

U.S. PATENT DOCUMENTS

| | | | |
|---|---|---|---|
| 1,292,737 | 1/1919 | Endreson | 210/318 X |
| 3,722,686 | 3/1973 | Arnett et al. | 210/314 X |
| 4,107,045 | 8/1978 | Turetsky | 210/266 |

FOREIGN PATENT DOCUMENTS 88267 12/1959 Denmark .................. 210/316 UX

*Primary Examiner*—Charles N. Hart
*Assistant Examiner*—Richard W. Burks

[57] ABSTRACT

A filter-purifier cartridge arranged so that a manually separable and manually replaceable hollow cylindrical purifier element is axially positioned and coupled to one end section of a tubular filter, the purifying medium within said purifier element contained between two removable and replaceable foraminous members, said members being optionally capable of manual removal and manual replacement; the filtering efficiency offered by radial flow through the wall of the filter element combined with an axial flow within the purifier element.

3 Claims, 3 Drawing Figures

FILTER-PURIFIER CARTRIDGE

1. Field of the Invention

This invention relates to a filter-purifier cartridge, and since it finds particular utility in the field of water filtration and purification, embodiments hereinafter described as illustrative of the invention and the advantages thereof are understood to be not restricted to such use.

There is a growing demand for an inexpensive filter element that can be periodically discarded, in combination with an economical purifying element. Both the efficiency and life of a combined filter and purifier cartridge depend on the quantity of purifying medium used and the surface area of the filter. In present types of filter-purifier cartridges the fluid does not flow uniformly through the purifying medium, whereas in an axial flow assembly the relatively small surface area of the filter decreases the life expectancy of the cartridge.

2. Objects of the Invention

An object of my invention is to provide a filter-purifier cartridge consisting of manually separable filter and purifier elements which can be removed when efficiency is impaired and replaced by a new cartridge.

Another object of my invention is the provision for manual removal of an impaired filter element and placing of a new filter element. In addition, the provision for changing the purifying medium within the purifier element for new purifying medium, resulting in a marked savings as compared to a throw away unit.

Another object of my invention is to combine the efficiency offered by radial flow through the walls of the filter element with an axial flow through the purifier element.

Embodiments of my invention capable of accomplishing the foregoing objects and providing the advantages contemplated by them and other advantages will become more apparent after studying the detailed description of the following specification which may be readily understood by reference to the accompanying drawings.

DETAILED DESCRIPTION OF THE DRAWINGS

Figure 1:
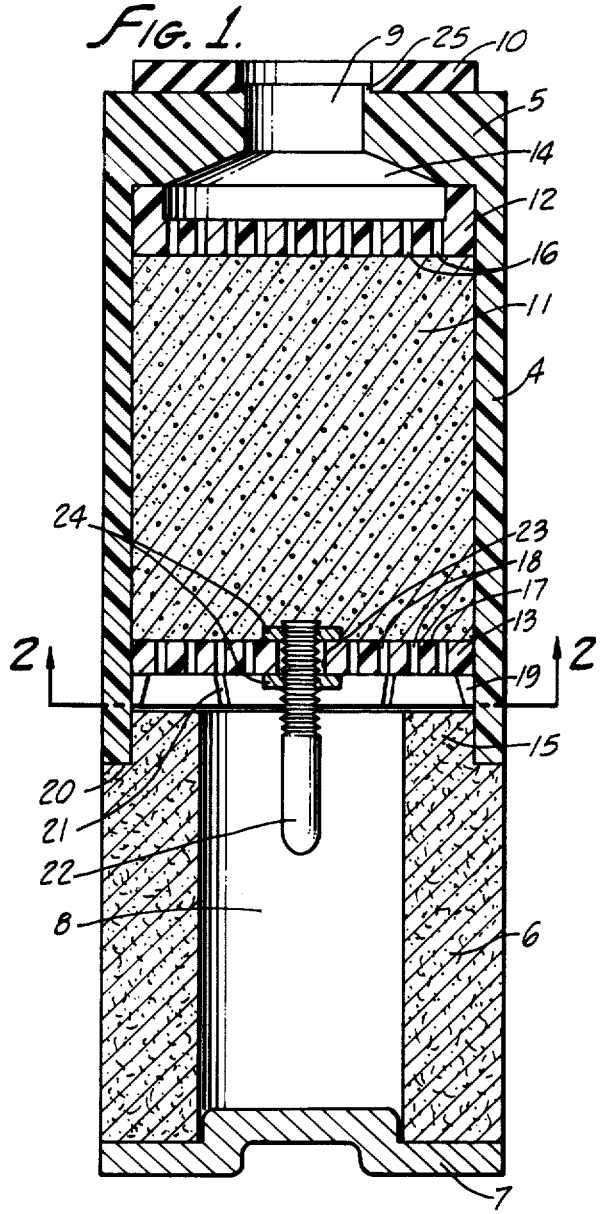
FIG. 1 is a side elevation sectional view of the filter-purifier cartridge of my invention.

Referring to FIG. 1 which is for illustrative purposes only, the numeral 4 indicates the hollow cylinder of the purifier element, said hollow cylinder having a top wall 5 and a concentric passage 9 through said top wall, said passage 9 communicates with the fluid stream within the hollow core of cylinder 4; the top wall preferably but not necessarily being integral with said hollow cylinder 4. The skirt of the perforated shallow cup 12 is a loose sliding fit in the hollow core of cylinder 4 and is contiguous to the inside of the top wall 5. A chamber 14 is located between said cup 12 and the concentric passage 9. The purifying medium 11 is confined within the hollow cylinder 4 by means of said perforated cup 12 and the perforated shallow cup 13. The skirt 19 of said perforated cup 13 is expanded and has a sliding frictional fit within the hollow cylinder 4, the optional slots 21 in said skirt 19 increases the flexibility of the skirt sidewall facilitating insertion and removal of said cup 13. A partially threaded stem 22 inserted through the center bore 23 of the perforated inverted bottom 17 of said shallow cup 13 is fastened to said bottom 17 by means of threaded nuts 24. The purpose of said stem 22 is to facilitate manual removal of the perforated cup 13, the loose fitting cup 12 also being manually removable. It will be evident that the illustrated perforated members can have a loose or frictional fit at one's option, and not necessarily be removable and replaceable by manual means alone. Also, said perforated members can be contained within the hollow cylinder 4 by threaded or other means while still being capable of removal and replacement. The externally recessed end section 15 of the permeable porous tubular filter 6 is inserted into the lower inlet end section of the hollow cylinder 4, being directly coupled to said cylinder 4; the shoulder 20 formed by externally recessing said end section of the tubular filter 6 bearing against the end wall of the hollow cylinder 4. A closure 7 bearing against the end wall of the uncoupled end section of tubular filter 6 seals the hollow core 8 at said end section. The ring gasket 10 surrounding passage 9 is held in position by means of the circular projection 25 from the top wall 5. If desired an "O" ring groove (not shown) can be disposed around the passage 9 within the top wall to retain an "O" ring (not shown) with which to seal a cartridge housing tubular discharge extension which can be inserted into passage 9.

In operation the filter-purifier cartridge as shown is subjected to axial compression after said cartridge is inserted in its housing. The housing is not part of my invention and is not shown. It will be evident that, while the filter housing is not illustrated, one skilled in the art can adapt the illustrated cartridge to a cylindrical housing having axially aligned inlet and outlet passages. One skilled in the art will also note that embodiments of the cartridge as shown are adapted to a common type of cartridge housing which is screwed onto a double ported end section containing an "O" ring to seal the single open end of said housing.

With the cartridge in use, the fluid flows through the pervious wall of the tubular filter element 6 into the hollow core 8 of said tubular filter, thence into the lower end section of hollow cylinder 4 and through the perforations 18 of cup 13 to enter and flow through the hollow core of cylinder 4 containing the purifying medium 11. The fluid then enters chamber 14 via the perforations 16 in cup 12 and exits through the discharge passage 9, said discharge passage 9 communicating with the discharge passage of the cartridge housing. The ring gasket 10 surrounding the cartridge discharge passage 9 and the cartridge housing discharge passage prevents any unprocessed fluid from being discharged through the cartridge housing discharge passage.

Figure 3:
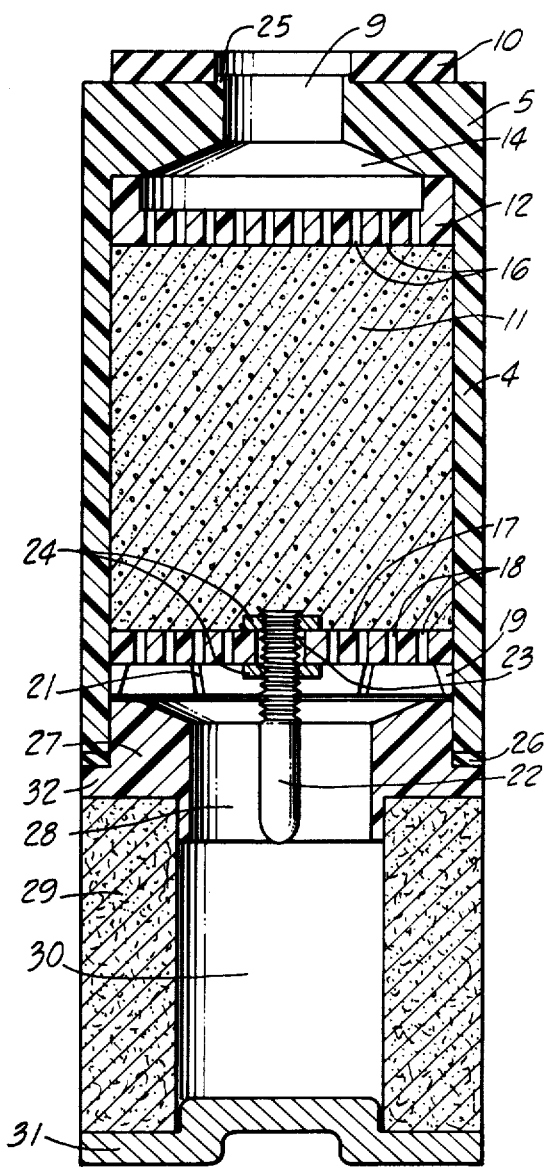
FIG. 3 is generally similar to FIG. 1 but shows a different couple connecting the filter and purifier elements.
Figure 2:
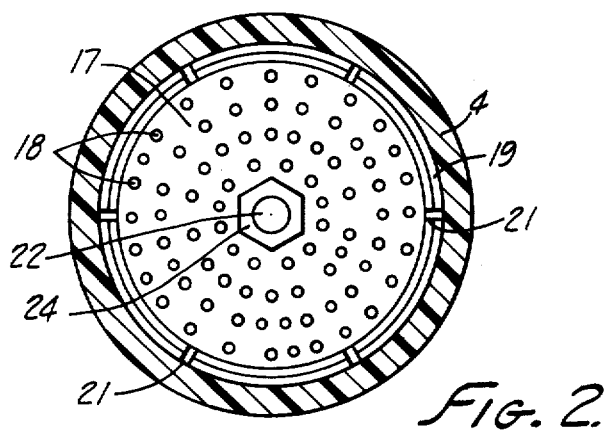
FIG. 2 is a transverse sectional view taken along line 2—2 of FIG. 1.

The construction shown in FIG. 3 is generally like that shown in FIG. 1 but uses a hollow coupling 27 to connect the tubular filter 29 to the lower inlet end section of the hollow cylinder 4. The section of the coupling 27 below the coupling collar 32 is inserted into the hollow core 30 of the tubular filter 29 so that the end wall of the coupled end section of said tubular filter bears against the lower end of coupling collar 32. The section of the coupling 27 above the collar 32 is inserted into the hollow core at the lower end section of hollow cylinder 4. A resilient, preferably rubber ring gasket 26 is disposed between the upper end of the collar 32 of said coupling 27 and the end wall of the lower end section of hollow cylinder 4 thereby preventing leakage between said collar 32 and said cylinder end wall. The end closure 31 bears against the end wall of the uncoupled end section of tubular filter 29 and seals the hollow core 30 at said tubular end section. The purifier element is similar to the purifier element shown in FIG. 1.

With the assembled cartridge shown in FIG. 3 subjected to compression in its cartridge housing the fluid flows through the pervious wall of the tubular filter 29 and enters the hollow core 30 of said tubular filter. The fluid then flows through the hollow core 28 of coupling 27 to enter the hollow core of cylinder 4. Since the purifier elements in FIG. 1 and FIG. 3 are similar, the fluid flow through said purifier elements is also similar.

The present invention contemplates alternate embodiments which can include a fiber winding on a reticulated or perforated core as a tubular filter element. A removable permeable sheath can be wound around the filter element.

It will be obvious to one skilled in the art that while the illustrated top wall 5 is an integral part of the hollow cylinder 4 said top wall can be made to contain the necessary seals and be removable and replaceable. An optional permeable porous disk can be disposed between the chamber 14 and perforated cup 12 to trap particles that may escape through the perforations of said cup 12. In addition, one skilled in the art can adapt different couplings to connect the purifier and filter elements. The inlet end section of the purifier element can be threaded to receive a threaded coupling. Also, the lower foraminous member can be disposed within the core of the coupling.

While those embodiments of this invention hereinbefore illustrated and described are fully capable of performing the objects and accomplishing the advantages primarily stated, it will be understood that this invention is not restricted to the specific embodiments hereinbefore set forth, but includes all modifications coming within the scope of the claims that follow.

I claim:

1. A filter-purifier cartridge for fluids, comprising: A manually separable and manually replaceable hollow cylindrical purifier element having inlet and outlet means, a top wall at one end, said inlet means at the other end, a concentric passage through said top wall, said passage being the discharge port of said cartridge, a frictional seal retained by said top wall and encircling said passage, purifying medium disposed between two separable and replaceable foraminous members within the hollow cylinder of said purifier element; said purifier element disposed axially and having its inlet end section coupled to one end section of a tubular filter, a closure disposed at the uncoupled end of said tubular filter; a chamber intermediate said concentric passage and one foraminous member within the hollow cylinder of said purifier element; the fluid stream within the hollow core of said tubular filter communicating with the concentric passage through said top wall via the interior of said purifier element wherein said purifying medium is contained, and said chamber, through said couple.

2. A filter-purifier cartridge for fluids, comprising: a manually separable and manually replaceable hollow cylindrical purifier element having inlet and outlet means, an integral top wall at one end, said inlet means at the other end, a concentric passage through said top wall, said passage being the discharge port of said cartridge, a frictional seal retained by said top wall and encircling said passage, purifying medium disposed intermediate two manually separable and manually replaceable foraminous members within the hollow cylinder of said purifier element; said purifier element positioned axially and having its inlet end section coupled to one end section of a tubular filter, a closure disposed at the uncoupled end of said tubular filter, a chamber existing between said concentric passage and one foraminous member within the hollow cylinder of said purifier element; the fluid stream through the hollow core of said tubular filter communicating with the concentric passage through said top wall via the hollow interior of said purifier element wherein said purifying medium is contained, and said chamber.

3. A filter-purifier cartridge as claimed in claim 2, in which the fluid stream through the hollow core of said tubular filter flows through said couple.

* * * * *